Figure 1:
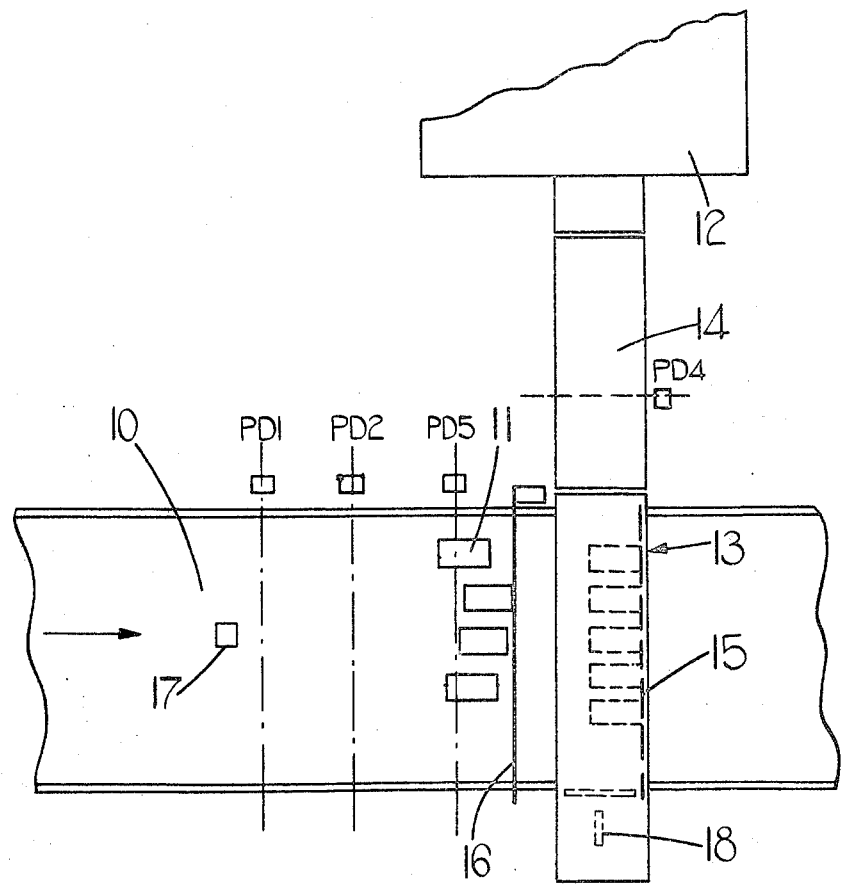

United States Patent [19]
Stephens et al.

[11] 3,884,343
[45] May 20, 1975

[54] TRANSFER APPARATUS

[75] Inventors: Derek James Stephens, Solihull;
Eseni Gogo MacFarlane, Northfield;
Owen James Turner, Bournville, all
of England

[73] Assignee: Cadbury Limited, Birmingham, England

[22] Filed: Mar. 12, 1973

[21] Appl. No.: 340,036

[30] Foreign Application Priority Data
Mar. 10, 1972 United Kingdom.................. 11297

[52] U.S. Cl. ................. 198/23; 198/32; 198/233
[51] Int. Cl. ............................................. B65g 47/52
[58] Field of Search .......... 198/23, 29, 32, 34, 164, 198/30, 233

[56] References Cited
UNITED STATES PATENTS

| | | | |
|---|---|---|---|
| 3,039,248 | 6/1962 | Jones ...................................... | 53/61 |
| 3,240,316 | 3/1966 | Huffman et al. ....................... | 198/34 |
| 3,251,452 | 5/1966 | Conway et al. ........................ | 198/34 |
| 3,429,416 | 2/1969 | Provost et al. ........................ | 198/32 |
| 3,463,291 | 8/1969 | Cummings ............................. | 198/30 |
| 3,492,780 | 2/1970 | Bastasch ................................ | 198/34 |
| 3,708,947 | 1/1973 | Green et al. ........................... | 53/61 |

*Primary Examiner*—Evon C. Blunk
*Assistant Examiner*—Richard K. Thomson
*Attorney, Agent, or Firm*—Holman & Stern

[57] ABSTRACT

The invention applies to apparatus for transferring transversely arranged spaced rows of units from a continuously moving main conveyor, in single file to a second conveyor extending transversely of the main conveyor. The apparatus includes a stop which is arranged to extend transversely across the main conveyor in a position to arrest rows of units a pusher transversely movable relative to the main conveyor for transferring a row of units bearing against the stop to the second conveyor, and an aligning member extending parallel to and in advance of the stop, the aligning member being arranged to arrest rows of units until individual units of a row are aligned transversely of the main conveyor.

15 Claims, 5 Drawing Figures

TRANSFER APPARATUS

This invention relates to apparatus for transferring transversely arranged spaced rows of units from a continuously moving main conveyor in single file to a second conveyor extending transversely of the main conveyor.

The object of the invention is to provide such apparatus in a convenient form.

According to the invention, apparatus for transferring transversely arranged spaced rows of units from a continuously moving main conveyor in a single file to a second conveyor extending transversely of the main conveyor comprises in combination a stop arranged to extend transversely across the main conveyor in a position to arrest rows of units on the main conveyor, a pusher transversely movable relative to the main conveyor for transferring a row of units bearing against the stop from the main conveyor to the second conveyor, an aligning member extending parallel to, and in advance of the stop, said member being arranged to arrest rows of units until individual units of a row are aligned transversely of the main conveyor and means for moving the aligning member to an inoperative position in which units can pass thereunder to the stop.

Figure 2:
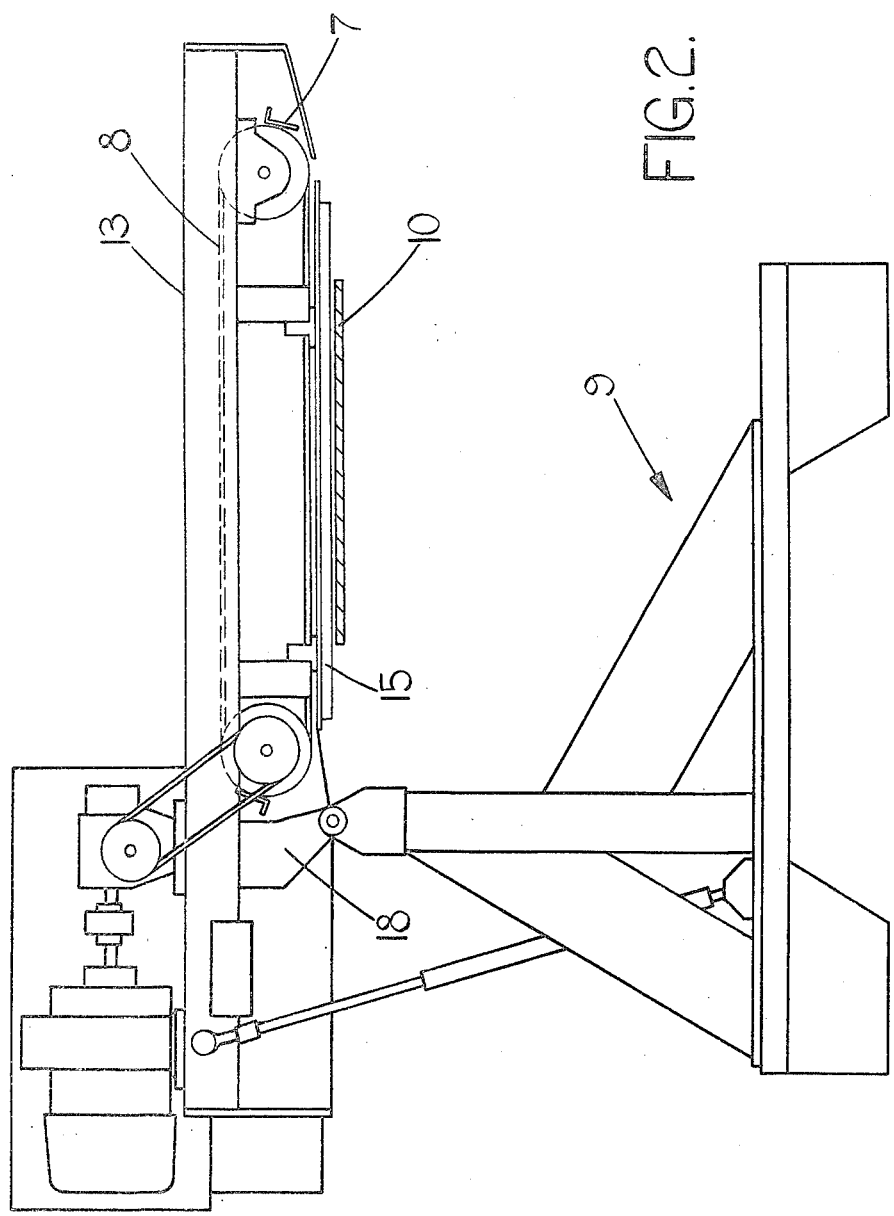
Figure 3:
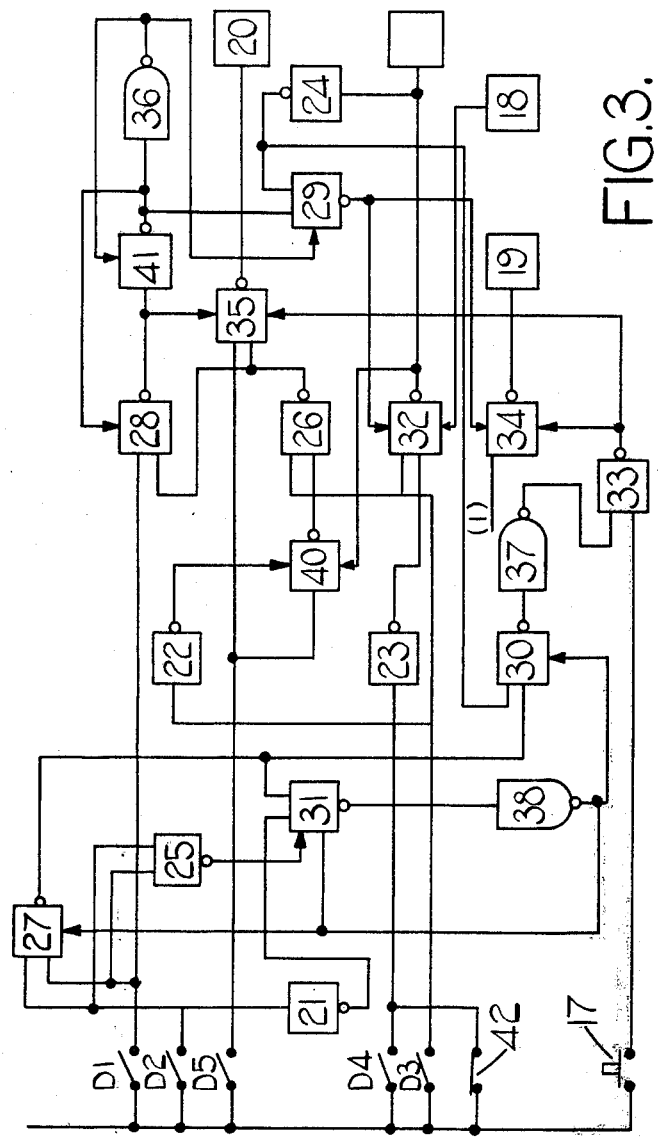
Figure 4:
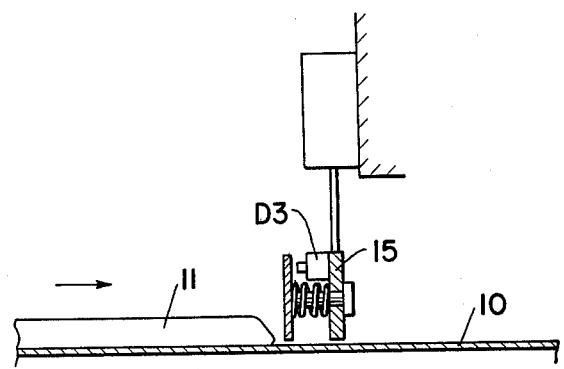
Figure 5:
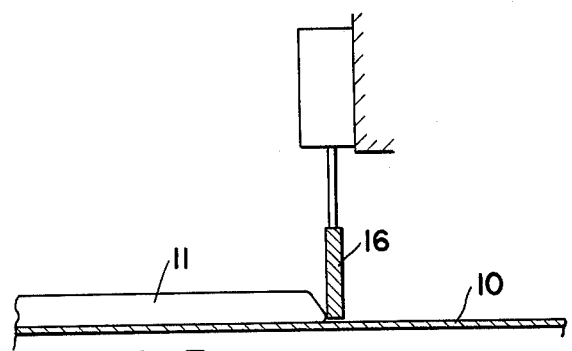

In the accompanying drawings:

FIG. 1 is a diagrammatic plan view of an example of the apparatus in accordance with the invention, FIG. 2 is an end elevation of a practical apparatus, FIG. 3 is a block diagram of the electrical circuit, and FIGS. 4 and 5 are enlarged and elevational views, partially in section, showing actuating mechanisms associated with parts of the apparatus shown in FIG. 1.

Referring to FIG. 1 of the drawings the apparatus forming the subject of this application is formed as a mobile structure which can be positioned at any convenient position beside a continuously moving belt conveyor 10 onto which units 11 such, for example, as bars of chocolate are fed to form rows extending transversely of the conveyor 10. The purpose of the illustrated apparatus is to transfer successive rows of units 11 to a wrapping machine 12 situated beside the conveyor 10.

The apparatus comprises a mobile frame 9 on which is mounted a beam 13 adapted to extend transversely across the conveyor 10 in cantilever fashion. The beam 13 is pivotally connected to the frame about a horizontal axis indicated at 13a, so that it can be turned up to an inoperative position, and carries an endless belt 8, or the like from which projects a pair of spaced pusher plates 7. The belt is arranged to be driven by an electric motor, and the arrangement is such that when the motor is energized with the beam in the operative position one of the pusher plates 7 will traverse the belt 10 laterally, and thereby push any units 11 situated beneath the beam 13, transversely from the conveyor 10 onto a conveyor 14 leading to the wrapping machine 12. A proximity switch 18 is provided and this closes when the pusher plate has completed its pushing operation.

Beneath the beam 13 is a stop 15 which extends transversely across the conveyor 10 in a postion to arrest the rows of units 11 as they pass under the beam 13 and which acts as a guide during the traversing of the pusher plate 7.

As shown in FIG. 4, the stop 15 can be moved independently of the beam 13 to an inoperative rejecting position in which it will permit units 11 to pass under it on the conveyor 10. Moreover, associated with the stop 15 is a switch D3 arranged to be actuated by the units 11 as they contact the stop 15. The actuating member of the switch D3 may take the form of a spring-loaded strip extending parallel to the stop 15 in a position to be depressed by the units 11.

As seen in FIGS 5, in advance of the beam 13, when considered in the direction of travel of the units 11 on the conveyor 10 is a row aligning bar 16 extending transversely across the conveyor, and movable under the control of electromagnetic means, between an operative position in which it is lowered to arrest the flow of units 11 on the conveyor, and an inoperative position in which it will permit the units 11 to pass thereunder. The bar 16 is positioned in advance of the stop 15 by a distance such in relation to the speed of the conveyor 10, that if the bar 16 is moved to its inoperative position at the time the motor is energized to actuate the pusher plate, the pusher plate will have sufficient time to transfer units bearing against the stop 15 to the belt 14 before they can be contacted by the units released by the bar 16.

In advance of the bar 16 by an amount very slightly more than the length of a unit 11 measured in the direction of travel of the conveyor 10, there is situated at one side of the conveyor 10 a light source directed onto an associated photoelectric cell PD5 situated at the opposite side of the conveyor. The height of the light source and cell is such that a unit 11 will interrupt the light falling on the cell as it passes along the conveyor 10, and the arrangement is such that movement of the bar 16 to the operative position is effected as the light falling upon the cell PD5 is interrupted, the bar 16 being automatically returned to the inoperative position to release the units as the last unit moves from the light beam.

The bar 16 therefore serves to align each transverse row of units 11 in turn prior to the row being released to the stop 15, it being understood that inaccurate alignment of the rows upon the conveyor 10 may be caused when the units are loaded onto the conveyor 10.

In advance of the light source and associated cell PD5 are two further spaced light sources situated at one side of the conveyor 10 and associated respectively with two photoelectric cells PD1 and PD2 at the opposite side of the conveyor 10. The light from these two light sources is interrupted from falling upon their associated cells by the passage of units 11, and the purpose of the cells PD1, PD2 is to measure the misalignment of a transverse row of units 11, and to cause rejection of this row by permitting it to pass under the stop 15 to a second and similar transfer apparatus beside the conveyor 10, or to a collection point, if the spacing between the leading unit of a row and the last unit of a row is too great to enable the apparatus to work satisfactorily.

A manually operable rejection switch 17 may be provided whereby the transfer apparatus can be caused to reject all the units should the occasion arise. In addition, a light source and associated photo-electric cell PD4 are positioned respectively at opposite sides of the conveyor 14 to give an indication in the event that the conveyor is full and cannot accept any more units from the conveyor 10.

With reference now to FIG. 3, the photo cells PD1, PD2, PD4 and PD5 are shown as switches D1, D2, D4 and D5 and these are closed when a unit interrupts the light falling on the respective photo cell. The switch D3 is correctly shown as such and is closed when units are pressing against the stop.

The stop 15 and the bar 16 are controlled by solenoid valves 19, 20 respectively and when the respective solenoid valves are energized the stop and the bar will assume the position in which they arrest movement of the units.

Considering now FIG. 3 in detail, several types of logic block are used. Each type will be described in detail and then referred to only as a block with the particular reference numeral. The blocks are all commercially available and are well known in the electronic art. Blocks 21, 22, 23 and 24 are "NOT" gates so that when an input signal is applied to the block there will be no output signal and vice versa. Blocks 25 and 26 are "and" gates arranged so that when two input signals are present, an output signal will be produced. Blocks 27, 28, 29 and 30 are also "AND" gates but they incorporate a memory so that when two input signals are present an output signal will be produced and this will remain even if one or both inputs are removed, the output signal being cancelled by an inhibit signal. Blocks 31 and 32 are similar to the previous blocks but in this case the block is arranged to receive an inhibit signal from two sources. Block 33 is an "OR" gate having two inputs, a signal supplied to one or the other input serving to provide an output signal. Block 34 is a gate to which a permanent input is supplied to produce a permanent output, the output being interrupted when an inhibit signal is applied facilities being provided for two inhibit signals. Block 35 is similar to block 34 except that facilities are provided for two input signals and an output is present when either one input signal is present. Blocks 40 and 41 are gates which incorporate memories and which produce an output signal when an input signal is supplied, the output signal remaining until it is cancelled by an inhibit signal. Block 40 can be supplied with two inhibit signals while block 41 can deal with only one inhibit signal.

In addition, blocks 36, 37 and 38 are timing devices which produce an output signal after a predetermined time upon the receipt and maintenance of an input signal.

One pole of each of the switches D1-D5 inclusive together with the reject switch 17 is connected to a supply rail 39. The other contact of switch D1 is connected to one input of block 28, one input of block 27 and one input of block 25 whilst the other terminal of switch D2 is connected to the other input of block 25, the other input of block 27 and one input of the block 21. The other terminal of switch D5 is connected to the input of block 40 and one of the inputs of block 35. The other terminal of switch D4 is connected to the input of block 23 and in parallel with switch D4 is a switch 42 associated with the wrapping machine 12 to which the units are fed by the conveyor 14. The other terminal of switch D3 is connected to the input of block 22, one of the inputs of block 26 and one of the inputs of block 32. The reject switch 17 is connected to one of the inputs of block 33.

The output of block 27 is connected to one input of the block 31 and one input of the block 30 and the other input to block 31 is derived from the output of block 21. The output of block 31 is connected to the input of block 38 and the output of this block is connected to the inhibit lines of blocks 30 and 27 and to one of the inhibit lines of block 31, the other inhibit line of block 31 is connected to the output of block 25.

The output of block 23 is connected to the other input of block 32 and the output of this latter block is connected to a solenoid valve associated with the operation of the feed mechanism. In addition, the output of block 32 is connected to the input of block 24 and to one of the inhibit lines of block 40. The other inhibit line of block 40 is connected to the output of block 22 and the output of block 40 is connected to the other input of block 26. The output of this latter block is connected to the other inputs of blocks 28 and 35. The output of block 35 is connected to the solenoid valve 20.

The output of block 28 is connected to the input of block 41 and to one inhibit line of block 35. The other inhibit line of block 35 is connected to the output of block 33 and this is also connected to one inhibit line of the block 34. The output of block 41 is connected to the input of block 36, one input of block 29 and the inhibit line of block 28. The output of block 36 is connected to the inhibit line of block 41 and to the inhibit line of block 29.

The input of block 29 is connected to the output of block 24 and also to the other input of the block 30. The output of block 29 is connected to one inhibit line of each of the blocks 32 and 34 and the other inhibit line of block 32 is connected to the proximity switch 18.

The output of block 34 is connected to the solenoid 19 and the output of block 30 is connected to the input of block 37 the output of which is connected to the other input of block 33. The input of block 34 is a permanent input which results in an output and therefore energization of the solenoid 19 until an inhibit signal is supplied to the block 34.

In operation assuming initially that the wrapping machine 12 is working correctly, the conveyor 14 is not full and that there are no units on the conveyor 10 in this condition the photo cells PD1, PD2, PD4 and PD5 will have light falling thereon so that the corresponding switches shown in FIG. 3 will be in the open position. Moreover, the switch D3 will be opened since no units will be pressing against the stop 15. The circuit will therefore operate to provide energization of the solenoid valve 19 and this will lower the stop 15. The valve 20 however associated with the bar 16 will not be energized and this will remain in the open position.

If a row of units now approaches the apparatus, switch D1 will close as the leading unit of the row interrupts the light and will re-open when the last unit of the row allows the light again to fall on the photo cell PD1. The same process will take place with switch D2 and for the moment it is assumed that switches D1 and D2 are not operated at the same time. The row of units will now approach the beam of light associated with the photo cell PD5 and the leading unit will interrupt the light falling on the photo cell with the effect that switch D5 is closed. This has the effect of supplying an input to one of the inputs of block 35 and this in the absence of inhibit signals produces an output to energize the solenoid 20 associated with the bar 16. As a result the bar 16 is lowered and so long as switch D5 is maintained in the closed state the bar will remain in its lowered position. With the bar in its lowered position the units of the row accumulate against it and the bar acts to align the units. The last unit of the row uncovers the photo cell to the light source so that in effect the switch D5 is opened and this removes the input signal from block 35 so that the output signal thereof disappears. The solenoid 20 therefore is de-energized and the bar 16 is raised to allow the aligned row of units to move towards the stop 15.

As has already been mentioned the stop 15 is in the lowered position but in this position it is capable of movement under the pressure applied by the units and when this occurs the proximity switch D3 is operated to supply an input to the block 32. The block 32 also receives its other input from the block 23 since the switch D4 is open. Block 32 therefore produces a continuous output and the motor is energized to actuate the pusher plate to sweep the units bearing against the stop 15 onto the conveyor 14. The output of block 32 is cancelled by means of the proximity switch 18 when the pusher has delivered the blocks to the conveyor 14. In the event that the wrapping machine is inoperative then a switch 42 connected in parallel with the switch D4 is closed and therefore the second input will not be supplied to the block 32. Similarly, if the wrapping machine is operating but the conveyor 14 is full switch 42 will be open but switch D4 will be closed and again the second input will not be supplied to the block 32. In this condition therefore the motor associated with the pusher plate will not be energized.

So far the mode of operation of the apparatus has taken into account only one row of units. The case will therefore be considered now where a second row of units is following the first row of units and the alignment of the units forming the second row is such that photo cells PD1 and PD2 are not obscured together during the passage of the second row of units therebetween. The mode of operation is exactly as described above in so far as the first row of units is concerned and in so far as the second row of units is concerned the bar 16 will be lowered as soon as the first unit of the second row of units obscures the photo cell PD5 so as to effect closure of the switch D5 shown in FIG. 2. The bar 16 will therefore be lowered and the units of the second row of units will accumulate against the bar as described above. If the first row of units has been disposed of to the conveyor 14 or is in the process of being delivered to the conveyor, then when the last unit of the second row of units clears the photo cell PD5 the bar 16 will be raised as described above. However, in the event that the first row of units remains in contact with the stop 15 due for instance to the wrapping machine being inoperative or the conveyor 14 being full, it is essential that the bar 16 should remain in the lower position. A signal to retain the bar in the lowered position is provided by the block 35. Normally this block receives an input signal from the switch D5 and when this input signal disappears the output signal also disappears so that the bar rises, however, the block 35 can also receive an input signal from the block 26 when the two inputs signals to this block are present. The first input signal is provided by the block 40 and the second input signal is provided by the switch D3. The bar will therefore remain in the lowered position, however, in the event that the conveyor 14 can receive units the switch D4 will be opened so that a signal will be provided to block 32 and this will effect feed of the first row of units to the conveyor 14 in addition an inhibit signal will be provided to the block 40 to remove one of the input signals to the block 26 and this will remove the output signal which is supplied to block 35 so that the bar will be raised to allow the second row of units to proceed towards the stop 15.

The effect so far described is to retain two rows of units against the bar and stop respectively until the wrapping machine or the conveyor 14 is able to accept the number of units in a row. It will be appreciated, however, that a third row of units may approach the apparatus and this is the next condition to be considered although this condition is only important in the event that the wrapping machine or the conveyor 14 are unable to accept a further row of units. It will be appreciated from an inspection of FIG. 1 that there is no means whereby a third row of units can be held other than by the bar 16 and this bar is already retaining the second row of units. It is apparent therefore that the first row of units must be released so that they travel with the conveyor 10 to the next wrapping machine. The second row of units are then allowed to move into position against the stop 15 and the third row of units move into position against the bar 16.

The indication that a third row of units is moving towards the apparatus is provided by the photo cell PD1 and the light falling upon this photo cell is interrupted by the leading unit of the third row. Again it is assumed that the third row of units are not aligned but that the degree of misalignment is such that photo cells D1 and D2 will not be obscured at the same time. Under the conditions described it will be appreciated that switch D1 will close during the time the units of the third row are obscuring the light falling on the photo cell PD1, switch D2 will be closed and switch D3 will also be closed. In addition, it will be appreciated that switch D5 will have been closed but will have re-opened. The signal produced by switch D5 however is stored in block 40 and one input signal is provided to block 26. The second input signal is also provided to block 26 by switch D2 so that one input signal is applied to block 35. Under normal circumstances, this would effect operation of the solenoid valve 20 to raise the bar 16, however, an inhibit signal is also provided to block 35. This is derived from block 28 which receives its first input signal from switch D1 and its second input signal from block 26. Besides an inhibit signal being provided to block 35 an input is provided to block 41 and this produces an output signal which is applied to block 29 and the other signal which this block requiress is provided by block 24. The receipt of the two signals by block 29 removes the inhibit signal from block 34 so that the stop 15 is raised to allow the first row of units to pass along the conveyor 10. The bblock 36 is a timer which after a predetermined time supplies an inhibit signal to block 29 and this removes the inhibit signal from block 34 so that the stop is lowered. The output of block 41 is applied as an inhibit signal to block 28 and this has the effect of removing the inhibit signal from block 35 so that the stop 15 is raised and the second row of units is moved by the conveyor 10 into contact with the stop 15. The third row of units effects operation of switch D5 in the manner described and as soon as the first unit of the third row of units interrupts the light falling on the cell PD5 the bar 16 will be lowered and the third row of units will accumulate and be aligned by the bar as previously described. As soon as the signal is received that the conveyor 14 is able to accept more units, then the row of units in this case the second row waiting against the stop 15 will be fed to the conveyor 14.

The next condition to consider is where rows of units are being carried along by the conveyor 10 and the alignment of one of the rows hereinafter called the fourth row, is such that photo cells PD1 and PD2 are obscured at the same time. A further row hereinafter referred to as the fifth row is following close behind the last unit of the fourth row. Under these conditions the bar 16 would fall as soon as the unit of the fourth row obscured the photo cell PD5 and the bar would remain down until the last unit of the fourth row cleared the photo cell PD5 so as to allow light to shine thereon. The process of alignment due to the bar 16 moves the leading units relative to the conveyor 10 until they are aligned with the last unit of the row. It has already been said that there is very little spacing between the last unit of the fourth row and the units of the fifth row and under this condition assuming that the conveyor 14 is empty and that there are no units lodged against the stop 15, the fourth row of units would proceed to abut the stop 15 and would then be fed to the conveyor 14 in the manner described. However, the fifth row of units is following close behind and would effect operation of the bar 16 in the normal manner as described. The condition could arise therefore that the units of the fifth row released by the bar could move into the path of the pusher before the latter has completed feeding the units of the fourth row to the conveyor 14. It is quite obvious that this cannot be allowed since it would mean that for instance some of the units of the fifth row would be engaged by the pusher and displaced laterally. Since the units of the fifth row are not correctly positioned for correct feeding to the conveyor 14 breakage of the units and possibly jamming of the apparatus would occur. In order to avoid this difficulty no attempt is made to feed the fourth row of units, the stop 15 being raised to allow the units to pass a further wrapping machine positioned further along the conveyor 10. It will be noted however that the units of the fourth row are aligned by the bar 16.

In describing the difficulty which arises due to the alignment of the units of a row exceeding the maximum permitted alignment, it has been assumed that no rows are positioned against the stop 15 and the bar 16, however, in practice it is likely that the second and third rows will be positioned against the stop and the bar respectively and that the wrapping machine or rather conveyor 14 is accepting rows of units. It is therefore important that no attempt is made to discard the rows for instance the second and third rows, which are correctly positioned and spaced merely because the units of the fourth row are misaligned more than the permitted extent. The stop 15 and bar 16 must not therefore be raised as soon as the photo cells D1 and D2 are obscured together but it is essential that the stop 15 should be raised when the fourth row of units moves into position. In order to achieve this object a timer is provided which provides a reject signal at the appropriate instant.

Referring now to FIG. 3 when switches D1 and D2 are closed two inputs are provided to block 27 and this provides an input to blocks 30 and 31. In addition, closure of switches D1 and D2 provides an input to block 25 which supplies an inhibit signal to block 31 which cancels any previous signal which may be present at the output of block 31. When switch D2 is opened a second input is provided to block 31 and the timer constituted by block 38 is started. A second input is provided to block 30 from block 24 in the event that the pusher is not operated and the output from block 30 starts the timer constituted by block 37. After a predetermined time which is the time taken for the fourth row to arrive at the bar 16, a signal will be provided to block 33 and this will supply inhibit signals to blocks 34 and 35. Block 35 provides an output signal to raise the bar 16 so that the fourth row moves towards the stop 15. It will be appreciated that this row is substantially aligned but is not completely aligned since the bar is raised slightly before complete alignment has taken place. The receipt of the inhibit signal by the block 34 raises the stop 15 so that the fourth row passes beneath the gate towards the next wrapping machine. Block 38 provides an inhibit signal when sufficient time has lapsed for the fourth row of units to clear the stop 15 and this cancels the output signals appearing at the outputs of blocks 30, 31 and 27. Thereafter the apparatus continues to operate as has been described. The same mode of operation occurs if the fourth and fifth units during their movement towards the apparatus on the conveyor 10 are too close together for the feed mechanism to operate correctly.

It is possible that the units are completely misplaced on the conveyor 10 due to some malfunctioning of the machine which deposits the units on the conveyor. In this event the bar 16 and the stop 15 are raised to allow the units to pass through the machine, the bar and stop being raised by the closure as described above of switches D1 and D2. The bars will remain in this position until a predetermined time after switch D2 has reclosed, the time interval being determined substantially as described above, by the operation of the timer constituted by block 38.

An operator may effect rejection of units merely by depressing the rejection switch 17. This has the effect of supplying a signal to the block 33 and this provides inhibit signals to the blocks 34 and 35. As a result the solenoid valve 19 is de-energized and the stop 15 is permanently raised whilst the solenoid valve 20 is permanently de-energized so that the bar 16 will be in the raised position.

We claim:

1. Apparatus for transferring transversely arranged rows of units from a continuously moving substantially horizontal main conveyor in a single file to a second conveyor, said second conveyor extending transversely of the main conveyor and at the same height said apparatus comprising a mobile frame movable to a position adjacent the main conveyor, a beam pivotally mounted on said frame and movable so as to extend transversely across and above the main conveyor in cantilever fashion, a stop mounted on said beam and extending transversely across the main conveyor in a position to arrest a row of units on the main conveyor, a pusher mounted on said beam and transversely movable relative to the main conveyor for transferring rows of units bearing against the stop from the main conveyor to the second conveyor, an aligning member extending parallel to, and in advance of the stop, said aligning member being arranged to arrest a row of units until individual units of a row are aligned transversely of the main conveyor and means for moving the aligning member to an inoperative position in which units can pass thereunder to the stop.

2. Apparatus as claimed in claim 1 including first sensing means operable to cause movement of the aligning member to its operative position when the first unit of a row passes the first sensing means and to cause movement of the aligning member to its inoperative position when the last unit of the row passes the first sensing means.

3. Apparatus as claimed in claim 2 including means operable to maintain said aligning member in the operative position if a further row of units is disposed against the stop and has not been displaced by said pusher.

4. Apparatus as claimed in claim 3 including means operable to move said stop to a rejecting position in which units can pass there-under in the event that a further row of units is moving along the conveyor towards the aligning member, the aligning member also being moved to the inoperative position to permit a row of units retained thereby to move towards the stop.

5. Apparatus as claimed in claim 3 including second and third spaced sensing means disposed upstream of the main conveyor from said first sensing means, said second and third sensing means both providing signals during the passage of a row of units, the presence of signals from the second and third sensing means at the same time providing an indication that the units of the row are misaligned by more than a predetermined amount.

6. Apparatus as claimed in claim 5 including means operable to move said stop to a rejecting position in which units can pass thereunder, said means being responsive to the presence of signals at the same time from said second and third sensing means and acting to cause said stop to reject the row of units which were misaligned by more than said predetermined amount in the event of a further row of units following closely behind said row and by a distance which would not enable the pusher to transfer said row of units to the second conveyor without risk of jamming.

7. Apparatus as claimed in claim 6 including timing means energized by the presence of signals at the same time from said second and third sensing means said timing means acting as a delay to prevent said stop moving to the rejecting position until the conveyor has moved said row of units to a position adjacent said stop.

8. Apparatus as claimed in claim 5 in which said sensing means comprises photo electric cells, the passage of light to which is interrupted by the units as they pass along the conveyor.

9. Apparatus as claimed in claim 8 including a further sensing device associated with the second conveyor, said further sensing device being ooperative to sense an accumulation of units on said second conveyor and to provide a signal indicative that the stop should be moved to the rejecting position in the event that a row of units is released by the aligning bar.

10. Apparatus as claimed in claim 9 including switch means associated with a machine supplied by said second conveyor, said switch means when the machine is inoperative providing a signal as that provided by the further sensing device when an accumulation of articles is sensed.

11. Apparatus as claimed in claim 1 including sensing means disposed upstream of the aligning member for sensing the passage of rows of artiicles towards the aligning member, said sensing means comprising three spaced sensing devices, the nearer one of which to the aligning member causes movement of the aligning member between its operative and inoperative positions and vice versa, the other two sensing devices acting to check the alignment of a row of units, and electrical means for processing the signals produced by said devices for ensuring that so far as possible rows of units are fed in turn to the second conveyor.

12. Apparatus as claimed in claim 11 including a further sensing device associated with said second conveyor, said further sensing device providing a signal to said electrical means to prevent the supply of a row of units to said second conveyor in the event of an accumulation of units on said second conveyor.

13. Apparatus as claimed in claim 12 including switch means associated with said pusher for providing a signal to said electrical means when a row of units has been transferred to said second conveyor thereby to stop the pusher.

14. Apparatus as claimed in claim 1 including a beam pivotally mounted on a support structure so as to be positioned transversely of the main conveyor said beam carrying said pusher, and said stop.

15. Apparatus as claimed in claim 14 in which said pusher is carried on an endless belt and motor means for moving said belt.

* * * * *